United States Patent
Lu

(10) Patent No.: US 12,151,161 B2
(45) Date of Patent: Nov. 26, 2024

(54) AIM ASSIST METHOD FOR ELECTRONIC GAMES

(71) Applicant: Garena Online Private Limited, Singapore (SG)

(72) Inventor: Chen Lu, Singapore (SG)

(73) Assignee: Garena Online Private Limited, Singapore (SG)

( * ) Notice: Subject to any disclaimer, the term of this patent is extended or adjusted under 35 U.S.C. 154(b) by 183 days.

(21) Appl. No.: 17/764,795

(22) PCT Filed: Nov. 19, 2021

(86) PCT No.: PCT/SG2021/050713
§ 371 (c)(1),
(2) Date: Mar. 29, 2022

(87) PCT Pub. No.: WO2022/119500
PCT Pub. Date: Jun. 9, 2022

(65) Prior Publication Data
US 2023/0078466 A1  Mar. 16, 2023

(30) Foreign Application Priority Data
Dec. 1, 2020  (SG) .......................... 10202011943Y

(51) Int. Cl.
*A63F 13/426*  (2014.01)
*A63F 13/422*  (2014.01)
*A63F 13/837*  (2014.01)

(52) U.S. Cl.
CPC .......... *A63F 13/422* (2014.09); *A63F 13/426* (2014.09); *A63F 13/837* (2014.09)

(58) Field of Classification Search
None
See application file for complete search history.

(56) References Cited

U.S. PATENT DOCUMENTS

2014/0243058 A1 * 8/2014 Tsuchiya ............... A63F 13/426
                                                      463/2
2021/0146248 A1 * 5/2021 Chen ..................... A63F 13/837

FOREIGN PATENT DOCUMENTS

| CN | 108939540 | 12/2018 |
| CN | 109011573 | 12/2018 |
| CN | 110404251 | 11/2019 |

OTHER PUBLICATIONS

YouTube video, Drewsky, Accuracy, Aim Assist & Range Explained In-Depth | Destiny 2 Shadowkeep, https://www.youtube.com/watch?v=qrJv7mj7Ab4, Feb. 15, 2020 (Year: 2020).*

* cited by examiner

*Primary Examiner* — Damon J Pierce
(74) *Attorney, Agent, or Firm* — David R. Stevens; Stevens Law Group

(57) ABSTRACT

A method for aim assist in electronic games is disclosed. The method comprises receiving a manipulation input from a user for moving the crosshair to different positions in the game environment, receiving a firing input from the user, executing an attack action in response to receiving the firing input from the user, and determining whether the crosshair is within the targeting area at the time of executing the attack action. In response to determining that the crosshair is within the targeting area at the time of executing the attack action, the method provides a computer-controlled input to adjust a position of the crosshair towards an auto-aim position on the target as the target moves from a first position to a second position in the game environment, wherein the executed attack action is directed in accordance with the adjusted position of the crosshair.

16 Claims, 14 Drawing Sheets

AIM ASSIST METHOD FOR ELECTRONIC GAMES

FIELD OF THE INVENTION

The invention pertains to electronic games, and in particular, aim assist for electronic games.

BACKGROUND

Electronic games may be played on various video game systems, including game consoles, personal computers, and mobile devices. Many electronic games can be considered shooter games, in which game play includes aiming a weapon at a target such as an enemy or other objects within the virtual game environment. Examples include first-person shooters and third-person shooters, which may encompass combat simulation games, flight or vehicle simulation games, and other avatar driven games. In a shooter game, a real world user (or player) typically interacts with a game controller (e.g., a user interface or input device) to control the actions of an avatar in the virtual game environment. The game controller may include multiple controller inputs configured to enable the user to maneuver the avatar around the virtual game environment, aim a weapon at a target, and activate the weapon to initiate an attack action directed at the target.

A user's reaction speed and hand-eye coordination are often challenged in shooter games. For example, in order for an attack action to hit (e.g., damage, injure, kill, or otherwise neutralize) an intended target, the user must aim the weapon at the target with some degree of accuracy before activating the weapon. When the intended target is stationary, a user is afforded more time to adjust the aim and activate the weapon such that the user-initiated attack action may hit the target.

It becomes significantly more difficult for the user to aim the weapon accurately at a given target when the target moves about the virtual game environment. For example, a user has to continuously adjust the aim of the weapon with sufficient speed and precision to direct a user-initiated attack action at the moving target. In another example, users playing electronic games on a touchscreen-based mobile device, including smart phones, smart watches, and tablets, often have to contend with aiming at a small target due to the small display screen area on mobile devices, which would demand greater concentration, skill and precision in manipulating the controller inputs to attack moving targets. Furthermore, it can be extremely challenging to play electronic games using a touchscreen. As a result, a user may spend significant time and effort when attacking moving targets, particularly if the user is not able to manipulate the controller inputs well or when the targets are displayed on a small display screen area. This negatively impacts a user's gaming experience. For example, users playing an unfamiliar game may be "put off" by the effort required to improve shooting accuracy in the game.

The significance of the aforementioned problems increases as advancing technology in video game systems allow an increasing number of targets, each of which moves about the virtual game environment, to be rendered in the virtual game environment at any one time. Thus, it is becoming more difficult and cumbersome for users to aim and hit moving targets in a virtual game environment.

What is required is a novel aim assist method which addresses the above problems by allowing a user to more easily and efficiently hit a target in an electronic game, thus making it easier for a user to play the game. Furthermore, other desirable features and characteristics will become apparent from the subsequent detailed description and the appended claims, taken in conjunction with the accompanying drawings and this background of the disclosure.

SUMMARY OF INVENTION

According to a first aspect of the present invention, a method for aim assist in electronic games is described, the method comprising generating a game environment in a device, and generating a crosshair and a target in the game environment, the target having a targeting area, the targeting area comprising a portion of the target and an area of space surrounding the portion of the target. The method further comprises receiving a manipulation input from a user for moving the crosshair to different positions in the game environment, receiving a firing input from the user, executing an attack action in response to receiving the firing input from the user, and determining whether the crosshair is within the targeting area at the time of executing the attack action. Executing the attack action when the crosshair is within the targeting area activates an aim assist to provide a computer-controlled input to adjust a position of the crosshair towards an auto-aim position on the target as the target moves from a first position to a second position in the game environment. The executed attack action is directed in accordance with the adjusted position of the crosshair.

Preferably, the computer-controlled input adjusts the crosshair from the targeting area onto the auto-aim position on the target, the auto-aim position being disposed along a central vertical axis of the target.

Preferably, the firing input is a sustained firing input, and in response to receiving the sustained firing input, executing the attack action and subsequent attack actions, and wherein executing the subsequent attack actions when the crosshair is within the targeting area provides the computer-controlled input to adjust the position of the crosshair to an offset position displaced from the auto-aim position.

Preferably, for every subsequent attack action, the offset position of the crosshair is displaced a greater distance away from the auto-aim position.

Preferably, the method further comprises determining a firing input duration of the sustained firing input, wherein a distance between the offset position and the auto-aim position increases in relation to an increase in the firing input duration.

Preferably, the method further comprises determining a firing input duration at the time of executing the attack action, wherein an increased firing input duration decreases a distance that the crosshair is moved towards the auto-aim position.

Preferably, the increased firing input duration exponentially decreases the distance that the crosshair is moved towards the auto-aim position.

Preferably, the auto-aim position is on a centre of a head of the target.

Preferably, the auto-aim position is on a centre of a body of the target.

Preferably, the device is a mobile computing device.

Preferably, the targeting area comprises a first targeting area, the first targeting area comprising a head of the target and an area surrounding the head of the target.

Preferably, the targeting area further comprises a second targeting area, the second targeting area is separate and distinct from the first targeting area.

Preferably, the second targeting area comprises a portion of a body of the target and an area surrounding the portion of the body of the target.

Preferably, the second targeting area is contiguous with the first targeting area.

According to a second aspect, the present invention provides a system comprising one or more computers and one or more storage devices storing computer-readable instructions that, when executed by the one or more computers, cause the one or more computers to perform all steps of any of the above-described methods. The same applies to one or more non-transitory computer storage media storing instructions that, when executed by one or more computers, cause the one or more computers to perform any of the above-described methods. The method can thus be easily transferred to other systems and carried out there.

Other aspects of the invention will become clearer from the following detailed description of some preferred embodiments thereof.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

Figure 1:
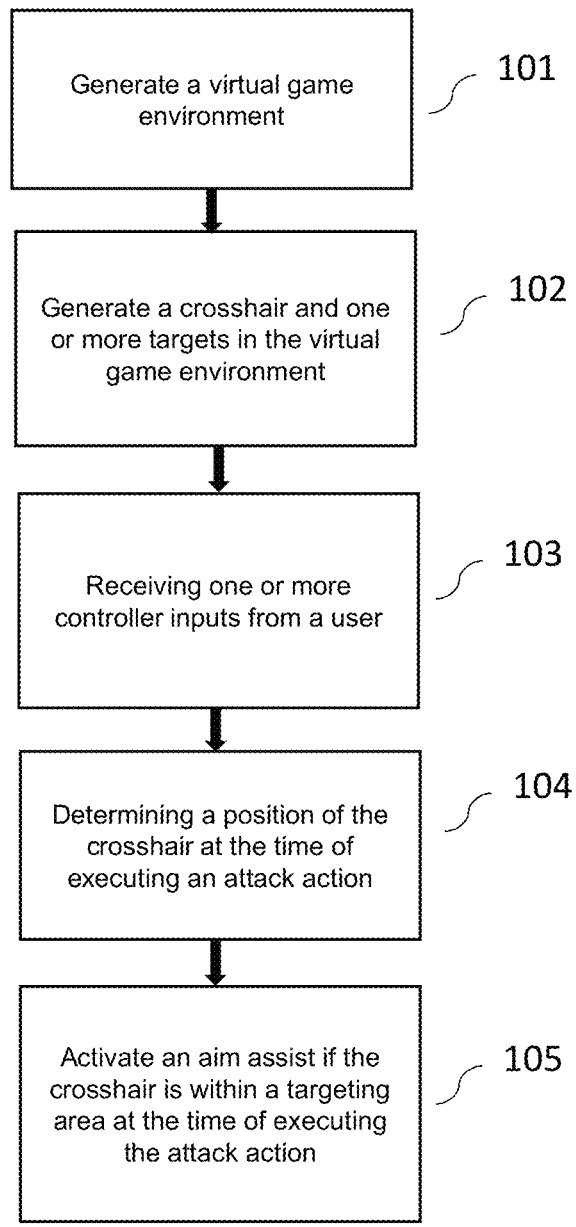
FIG. 1 is a flowchart showing a method for aim assist, in accordance with certain embodiments.

Skilled artisans will appreciate that elements in the figures are illustrated for simplicity and clarity and have not necessarily been depicted to scale. For example, the dimensions of some of the elements in the block diagrams or steps in the flowcharts may be exaggerated relative to other elements to help improve understanding of the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It is the intent of certain embodiments to teach a method for aim assist in electronic games, the method comprising the steps of generating a game environment in a device, generating a crosshair and a target in the game environment, and the target having a targeting area. The targeting area comprising a portion of the target and an area surrounding the portion of the target. The method further comprises the steps of receiving a manipulation input from a user for moving the crosshair to different positions in the game environment, and receiving a firing input from the user. An attack action is executed in response to receiving the firing input from the user.

The method further comprises the steps of determining whether the crosshair is within the targeting area at the time of executing the attack action, and in response to determining that the crosshair is within the targeting area at the time of executing the attack action, performing a computer-controlled input to adjust a position of the crosshair towards an auto-aim position on the target as the target moves from a first position to a second position in the game environment, wherein the executed attack action is directed in accordance with the adjusted position of the crosshair.

In some embodiments, the aim assist method as described herein performs computer-controlled inputs, which adjust the crosshair from the targeting area towards the centre of the target, to assist the user in attacking moving targets with high accuracy and efficiency, thereby allowing users to easily hit moving targets in the game environment. For example, the aim assist method allows users to easily direct user-initiated attack actions towards moving targets displayed on the small display screen of mobile devices. The aim assist method as described herein is particularly beneficial for novice players as they would be able to enjoy aiming and hitting the target more efficiently even when they are unfamiliar with the game.

Furthermore, in some embodiments, the aim assist method as described herein performs the aiming for the user and allows the user to hit moving targets easily even if the user does not have great proficiency in manipulating the controller inputs. For example, electronic games (e.g., mobile games) that are configured for touchscreen-based mobile devices, including tablets, smart phones, smart watch, portable media players, touch-enabled laptops, and personal digital assistants (PDAs), typically employ touchscreen controls as the primary controller inputs. Touchscreen controls may be sensitive to finger movements and poorly controlled finger movements may reduce the user's precision and accuracy in aiming, in particular when the target is in motion and the user is required to constantly manipulate the touchscreen controls to aim and hit the moving target.

As such, the aim assist method as described herein is particularly beneficial for users seeking to easily direct user-initiated attack actions towards the centre of moving targets using touchscreen controls, or other similar controls which require delicate and precise manipulation.

FIG. 1 is a flowchart describing a method for aim assist in electronic games, in accordance with certain embodiments. The steps identified in FIG. 1 are exemplary and may include various alternatives, equivalents, or derivations thereof including but not limited to the order of execution of the same. The steps of FIG. 1 (and its various alternatives) may be embodied in hardware or software including a computer-readable storage medium including instructions executable by the likes of a processor in a computing device. The exemplary method may be performed repeatedly during game play.

In step 101, the method generates a virtual game environment (hereinafter "game environment") in a video game system. In some embodiments, the game environment may be a game level or world associated with shooter games. For example, the game environment may be displayed from a game viewpoint relative to the user's avatar (e.g., first-person viewpoint or third-person viewpoint). The game environment may be displayed on a display screen of a device, such as but not limited to a mobile device, a personal computer, a game console, and a television. As the user maneuvers the avatar around the game environment, the display of the game environment may be adjusted to reflect the changes around the user's avatar.

In step 102, the method generates a crosshair and one or more targets in the game environment. In some embodiments, the crosshair functions as an aiming indicator that the user may use to aim a weapon (e.g., gun or fists) at a target. The crosshair is, for example, a circle, a bullseye, a coloured display, a cross, an 'x', or some other visual indicia displayed on the display screen. In some embodiments, the one or more targets may be configured to move about the game environment. For example, the one or more targets are enemy characters. Designating other objects in the game environment as targets may also be useful.

Figure 2A:
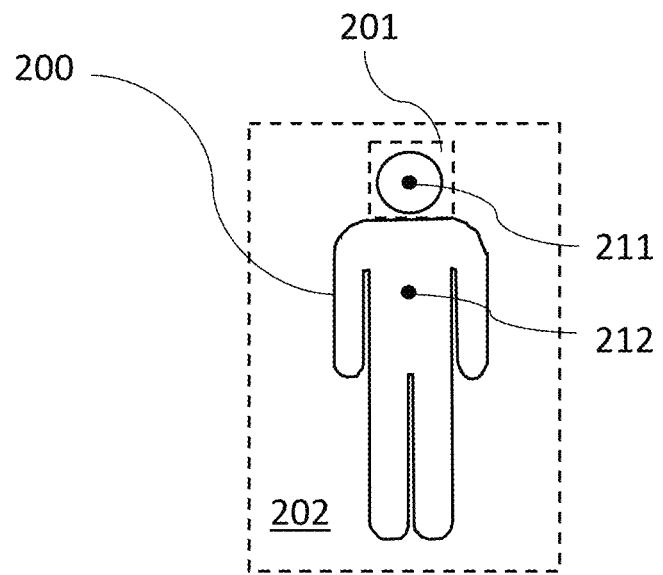
FIG. 2a shows a frontal view of a target and FIG. 2b shows a side view of the target, in accordance with certain embodiments.
Figure 2B:
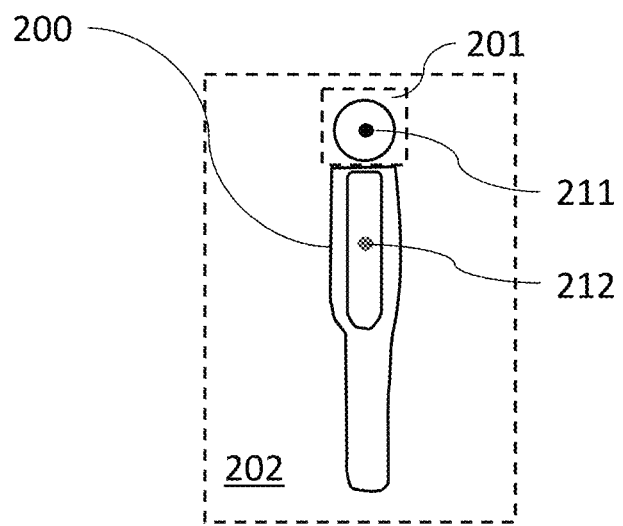

As shown in FIGS. 2*a*, 2*b*, 3*a* and 3*b*, a target 200 may be defined with a first targeting area 201 and a second targeting area 202. For example, the first targeting area 201 surrounds the head of the target (hereinafter "head") and the second targeting area 202 surrounds the body and limbs of the target (hereinafter "body"). In some embodiments, the first targeting area 201 extends a predefined distance away from the head and the second targeting area 202 extends a predefined distance away from the body. The first targeting area 201, for example, includes a surface area of the head and an area (or space) surrounding the head. The second targeting area 202, for example, includes a surface area of the body and an area (or space) surrounding the body. The first 201 and second 202 targeting areas may be separate and distinct targeting areas. For example, the first targeting area 201 may be contiguous with the second targeting area 202, as shown in FIGS. 2*a* and 2*b*. The first targeting area 201 may be referred to as the head targeting area and the second targeting area 202 may be referred to as the body targeting area.

Figure 3A:
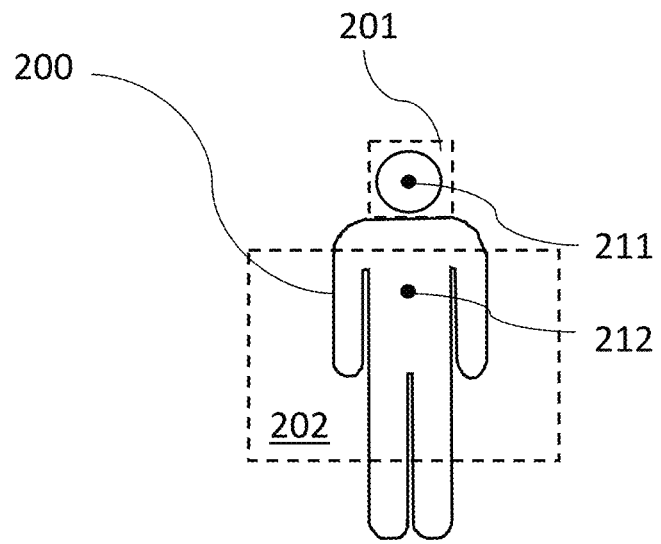
FIG. 3a shows a frontal view of a target and FIG. 3b shows a side view of the target, in accordance with certain alternative embodiments.
Figure 3B:
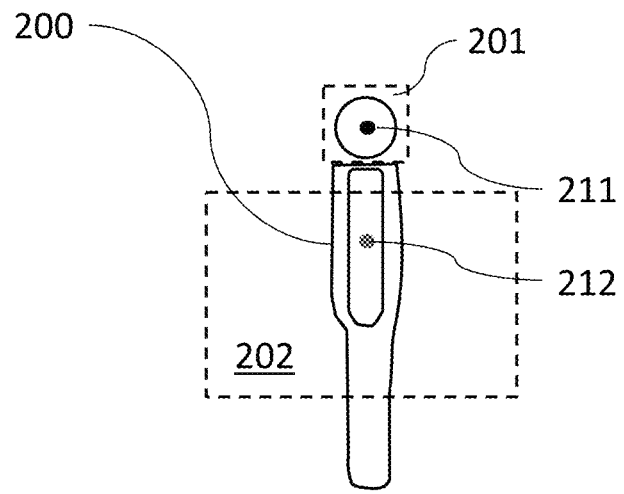

In other embodiments, the body targeting area 202 may be configured to partially surround the target 200, as shown in FIGS. 3*a* and 3*b*. For example, the body targeting area 202 includes a portion of the body's surface area and a certain area of space surrounding (or bordering) that portion of the body. The head targeting area 201 is, for example, adjacent to the body targeting area 202. Other configurations of the head and body targeting areas 201 and 202 may also be useful.

In some embodiments, a first auto-aim position 211 may be defined on the target 200 within the head targeting area 201. For example, the first auto-aim position 211 may be centrally located on the head of the target 200 and disposed along a central vertical axis (not shown) of the target 200. The first auto-aim position 211 is, for example, configured to function as a first predefined endpoint position for a computer-controlled crosshair aim assist to move the crosshair towards such that a user-initiated attack action is directed at the centre of the head of the target (e.g., head shot). In some embodiments, a second auto-aim position 212 may be defined on the target 200 within the body targeting area 202. For example, the second auto-aim position 212 may be centrally located on the body of the target 200 and disposed along the central vertical axis (not shown) of the target 200. The second auto-aim position 212 is, for example, configured to function as a second predefined endpoint position for a computer-controlled crosshair aim assist to move the crosshair towards such that a user-initiated attack action is directed at the centre of the body of the target (e.g., body shot).

Returning to FIG. 1, in step 103, the method receives one or more controller inputs from the user. For example, the one or more controller inputs may be user-controlled inputs performed using a graphical user interface or an input device. In some embodiments, the one or more controller inputs may be performed by the user using touchscreen controls displayed on a touchscreen-enabled display screen. The touchscreen controls are, for example, operated by users playing electronic games on a touchscreen-based mobile device. In other embodiments, the one or more controller inputs may be performed by the user using an input device, such as but not limited to gamepads, joysticks, mice, and keyboards. The input device is, for example, operated by users playing electronic games on video game consoles or personal computers.

In some embodiments, the one or more controller inputs include a set of manipulation inputs and at least one firing input. The manipulation inputs are, for example, performed by the user to move the crosshair in different directions and to different positions in the game environment. In some embodiments, the crosshair may be moved freely about the display screen without adjusting the game viewpoint. For example, the manipulation inputs may be configured to aim the crosshair at a target by moving the crosshair vertically or horizontally across the display screen to a position on (or within) the target 200. In other embodiments, the crosshair may be locked to the centre of the display screen. For example, the manipulation inputs may be configured to pan the game viewpoint in correspondence with the movement of the crosshair such that the crosshair is maintained at the centre of the game viewpoint. The manipulation input may include information concerning a length of time that an input element for performing the manipulation input is operated. For example, the user may press a button or operate a joystick for a certain length of time to continuously move the crosshair in a particular direction. The manipulation input may end when the input element for performing the manipulation input is no longer operated.

In some embodiments, the firing input is configured to enable the user to initiate and execute an attack action, such as but not limited to shooting a projectile from a weapon (e.g., gun), launching a magical attack, throwing an explosive device (e.g., grenade), thrusting a sword, or throwing a punch. For example, the firing input may be performed by the user to trigger, use, or "fire" a weapon. The firing input may include information concerning a length of time that an input element for performing the firing input is operated. For example, the user may press and hold a button for a certain length of time to execute consecutive attack actions (i.e. sustained firing input). In another example, the user may press and quickly release the button to execute a single attack action (i.e. intermittent firing input). The firing input may end when the input element for performing the firing input is no longer operated. The user-initiated attack action is, for example, directed in accordance with a given position of the crosshair. It is understood that the controller inputs may also be configured to include other user-controlled inputs for controlling the actions of the user's avatar (e.g., directing the avatar's movements, picking up and dropping objects, etc.).

During game play, one or more manipulation inputs may be received from the user to move the crosshair towards a target 200. In some embodiments, the crosshair is configured to visually alert the user when the crosshair is moved (or adjusted) onto any targeting area of any given targets. For example, the colour of the crosshair changes from a default colour (e.g., white) to a different colour (e.g., red) for visual emphasis when the crosshair is within the first targeting area 201 or second targeting area 202. It is understood that the crosshair may also be configured to exhibit other visual effects (e.g., flashing, made bold, highlighting, etc.) to provide visual alert. A firing input may be received from the user to execute one or more attack actions after moving the crosshair.

In step 104, the method determines a position of the crosshair at the time of executing an attack action. For example, the method determines whether the crosshair is within either the first targeting area 201 or second targeting area 202 of a target 200 at the time of executing the attack action. Alternatively, the method may determine a position of the crosshair immediately prior to executing an attack action. For example, the method may determine whether the crosshair is within either the first targeting area 201 or second targeting area 202 of a target 200 a split second (e.g., 0.5 seconds or less) before executing the attack action. In some embodiments, if the crosshair is determined to be on the first targeting area 201 or the second targeting area 202 at the time of executing the attack action, the method proceeds to step 105.

In step 105, the method activates an aim assist. The aim assist refers to a computer-controlled input being performed to adjust a position of the crosshair towards a predefined endpoint position on the target 200 (first auto-aim position 211, second auto-aim position 212) and direct the executed attack action in accordance with the computer-adjusted position of the crosshair. Computer-controlled input refers to actions initiated by the computer and performed entirely by the computer. These actions are completely independent of any user provided input (or user-controlled input) and are automatic. In some embodiments, the aim assist performs a computer-controlled input to adjust the position of the crosshair despite the absence of receiving any manipulation input from the user. In other embodiments, the aim assist performs a computer-controlled input to adjust the position of the crosshair regardless of receiving any manipulation input from the user. For example, the aim assist ignores or disregards any manipulation input received from the user while automatically adjusting the position of the crosshair towards the first auto-aim position 211 or second auto-aim position 212 in accordance with the aim assist configuration.

In some embodiments, executing an attack action when the crosshair is within either the first targeting area 201 or the second targeting area 202 initiates a computer-controlled input which adjusts the crosshair towards the auto-aim position associated with the particular targeting area. For example, in response to executing an attack action at the time the crosshair is within the first targeting area 201, the computer-controlled input automatically adjusts the crosshair towards and onto the first auto-aim position 211. In another example, in response to executing an attack action at the time the crosshair is within the second targeting area 202, the computer-controlled input automatically adjusts the crosshair towards and onto the second auto-aim position 212.

In some embodiments, the executed attack action is directed in accordance with the computer-adjusted position of the crosshair. For example, if executing an attack action initiates a computer-controlled input which adjusts the crosshair onto the first auto-aim position 211, the executed attack action will be directed at the first auto-aim position 211. In another example, if executing an attack action initiates a computer-controlled input which adjusts the crosshair onto the second auto-aim position 212, the executed attack action will be directed at the second auto-aim position 212. The computer-controlled input advantageously provides aiming assistance to novice players to direct an attack action at a centre of a given target 200 with increased accuracy while still challenging novice players to take aim at the target 200 by positioning the crosshair anywhere within the targeting areas (201, 202). As each of the targeting areas (201, 202) is bigger or larger than the centre portions of the target 200, the targeting areas effectively enlarge the area in which a user-initiated attack action can affect the target, thus making it easier for the player to hit the centre of the target 200 (e.g., at the centre of the head or body).

The automatic adjustment of the crosshair may be effected instantaneously. Alternatively, the automatic adjustment of the crosshair may be effected over a certain time period to allow for a smooth transition. The method may automatically adjust the crosshair independently of the game viewpoint. For example, the computer-controlled input does not move the game viewpoint. Alternatively, the method may adjust the game viewpoint in correspondence with the movement of the crosshair.

In some embodiments, the method deactivates the aim assist following the computer-controlled adjustment of the crosshair onto either the first auto-aim position 211 or the second auto-aim position 212. For example, the computer-controlled input ends immediately after automatically adjusting the position of the crosshair. The crosshair may be moved in accordance with a manipulation input received from the user after the aim assist is deactivated. For example, if the target 200 moves after the crosshair is automatically adjusted onto the first auto-aim position 211 (or second auto-aim position 212), the crosshair remains stationary in the absence of receiving any manipulation input from the user. The method may repeatedly reactivate the aim assist for each subsequent user-initiated attack action that is executed when the crosshair is within the first targeting area 201 or the second targeting area 202.

In some embodiments, a strength of the aim assist (hereinafter "assist strength") is inversely related to a duration of the firing input (hereinafter "firing input duration") received from the user. The assist strength refers to the extent (e.g., length of space) that the crosshair is moved towards the first auto-aim position 211 or the second auto-aim position 212. The assist strength, for example, decreases from a maximum value as the firing input duration increases. For example, the crosshair is moved from anywhere within the targeting areas (201, 202) onto the first auto-aim position 211 (or the second auto-aim position 212) when the assist strength is at a maximum value. In another example, a decrease in the assist strength results in the crosshair being moved to an offset position that is displaced a distance away from the first auto-aim position 211 (or the second auto-aim position 212). The assist strength is, for example, determined at the time of activating the aim assist. In some embodiments, the firing input duration may be determined based on the elapsed time between the start of receiving the firing input (which initiated the attack action that activated the aim assist) and the time the aim assist is activated. In other embodiments, the firing input duration may be determined based on the elapsed time between the start of receiving the firing input (which initiated the attack action that activated the aim assist) and the end of receiving the particular firing input.

The firing input received from the user may be a sustained firing input having a long firing input duration, or an intermittent firing input having a short firing input duration. In some embodiments, a sustained firing input may be received from the user to execute consecutive attack actions.

The sustained firing input, for example, executes two or more attack actions in succession. Each of the two or more attack actions executed by the sustained firing input may activate the aim assist. For example, the sustained firing input executes a first attack action when the crosshair is within either the first targeting area 201 or the second targeting area 202 to activate a first aim assist. In some embodiments, the assist strength is at a maximum value at the time of executing the first attack action associated with a given firing input, such as an intermittent firing input or a sustained firing input. For example, in response to executing a first attack action at the time the crosshair is within the first targeting area 201, a first computer-controlled input automatically adjusts the crosshair onto the first auto-aim position 211.

In some embodiments, the firing input is a sustained firing input which continues to execute a second attack action subsequent to the first attack action. The second attack action is, for example, executed when the crosshair is within the first targeting area 201 to activate a second aim assist. In some embodiments, the assist strength decays (or decreases from a maximum value) by a first resistance value at the time of executing the second attack action in association with a sustained firing input. The resistance value determines a displacement distance of the crosshair from the first auto-aim position 211 or the second auto-aim position 212. For example, a higher resistance value results in the crosshair being moved to an offset position that is displaced a greater distance away from the first auto-aim position 211 (or the second auto-aim position 212).

In some embodiments, the crosshair may be moved in a direction towards the first or second auto-aim position (211 or 212) and onto the offset position. For example, in response to executing an attack action (e.g., second successive attack action) in association with a sustained firing input at the time the crosshair is within the first targeting area 201, a second computer-controlled input automatically adjusts the crosshair towards the first auto-aim position 211 and onto a first offset position that is displaced a distance away from the first auto-aim position 211. In some embodiments, the offset position may be displaced an increasing distance away from the first auto-aim position 211 or the second auto-aim position 212 such that the crosshair may be moved in a direction away from the first or second auto-aim position (211 or 212) and onto the offset position. For example, in response to executing an attack action (e.g., fifth successive attack action) in association with a sustained firing input at the time the crosshair is within the second targeting area 202, a fifth computer-controlled input automatically adjusts the crosshair away from the second auto-aim position 212 and onto a fourth offset position that is displaced outside of the second targeting area 202. Therefore, the longer the player holds or sustains the firing input, the less beneficial the aim assist becomes (i.e., crosshair is moved an increasing distance away from the centre of the target 200). In some embodiments, the resistance value may increase exponentially in relation to the firing input duration. For example, the resistance value increases exponentially after each successive attack action associated with the sustained firing input. Alternatively, the resistance value may also be configured to increase linearly in relation to the firing input duration.

As explained, the assist strength or accuracy of the aim assist diminishes as the firing input duration increases. This inverse relationship between the assist strength and the firing input duration advantageously avoids making gameplay too easy when a sustained firing input is performed as the user is encouraged to end the sustained firing input early and regain manual control of the crosshair to move the crosshair closer to the target. For example, it becomes increasingly difficult for the user to manually position the crosshair within the targeting area (201, 202), particularly if the target 200 is moving, each time the crosshair is automatically adjusted an increasing distance away from the centre of the target 200 during a sustained firing input. Therefore, the user is encouraged to end the sustained firing input early to more easily adjust the aim of the crosshair towards the target 200 such that the crosshair is maintained within the targeting area (201, 202) to enable the activation of the aim assist. This is to balance the benefits of the aim assist provided by the method described herein with the satisfaction that a user may derive from manually aiming and hitting the target 200.

FIGS. 4a-4d show an exemplary game environment displayed from a game viewpoint on a display screen 400 of a device, in accordance with certain embodiments. The device may include a video game system or module. In some embodiments, the display screen 400 is a user interface of a touchscreen-based mobile device and the game environment is displayed from a first-person viewpoint. The display screen 400, for example, includes graphical or textual symbols representative of touch screen controls. Other types of display screen and game viewpoint may also be useful. In some embodiments, the touch screen controls include a first graphical controller input element (not shown) and a second graphical controller input element (not shown). The first graphical controller input element (hereinafter "manipulation input element") may be associated with a set of manipulation inputs and the second graphical controller input element (hereinafter "firing input element") may be associated with a firing input. For example, the manipulation input element may be a virtual joystick configured to move the crosshair to different positions in the game environment, and the firing input element may be a virtual button configured to initiate and execute an attack action.

Figure 4A:
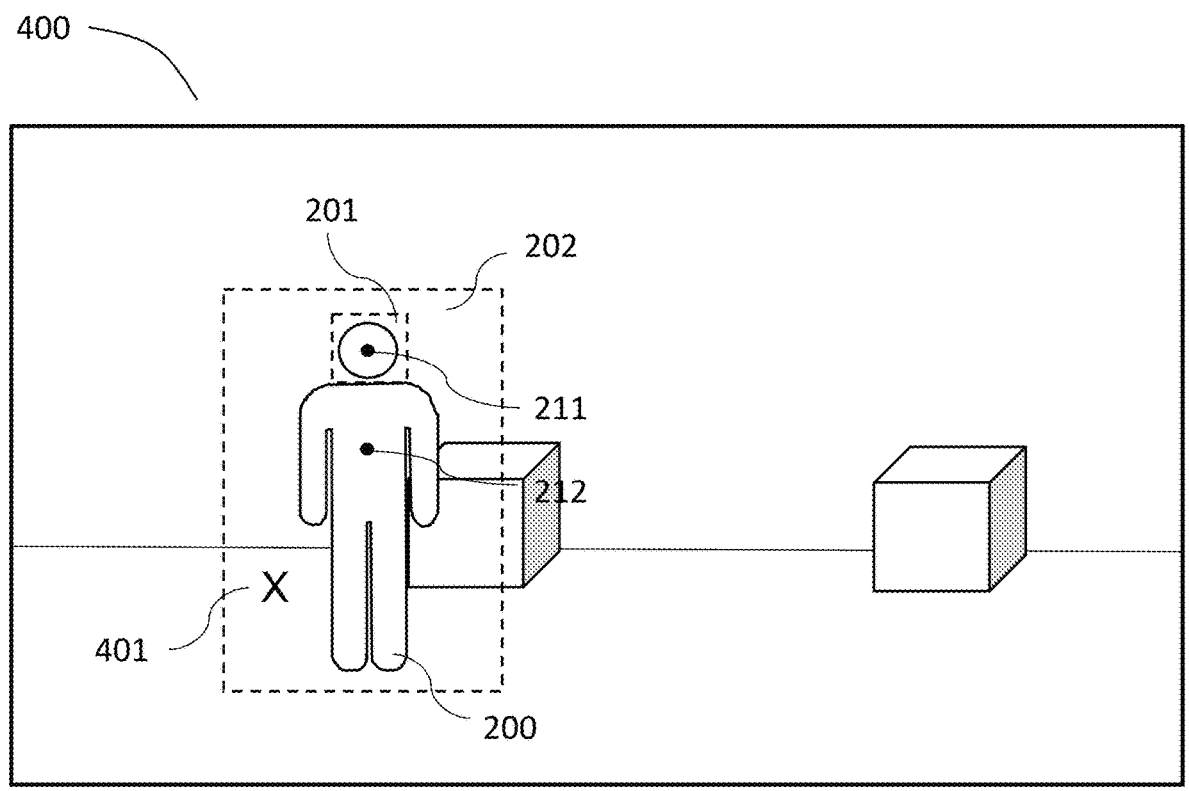
FIG. 4a shows a game environment with a crosshair and a target.

Referring to FIG. 4a, the game environment includes a crosshair 401 and a target 200 as referenced in step 102 of FIG. 1. During game play, the user may operate the manipulation input element to perform one or more manipulation inputs, which are sent to the video game module, to aim the crosshair 401 at the target 200. The target 200 is, for example, in a stationary position. The user may then operate the firing input element to perform a firing input, which is sent to the video game module, to initiate and execute an attack action. The firing input may be an intermittent firing input which the user performs by, for example, tapping on the firing input element. In some embodiments, the crosshair 401 may be within the first or second targeting area 201 or 202 without being on the target when an attack action is executed. As shown in FIG. 4a, the crosshair 401 may be anywhere within the second targeting area 202 and a distance away from the target 200 when an attack action is executed. In other embodiments, the crosshair 401 may be anywhere within the first targeting area 201 and a distance away from the target 200 when an attack action is executed. Upon executing the attack action, the video game module may then activate an aim assist, as referenced in step 105 of FIG. 1, to direct the executed attack action.

Figure 4B:
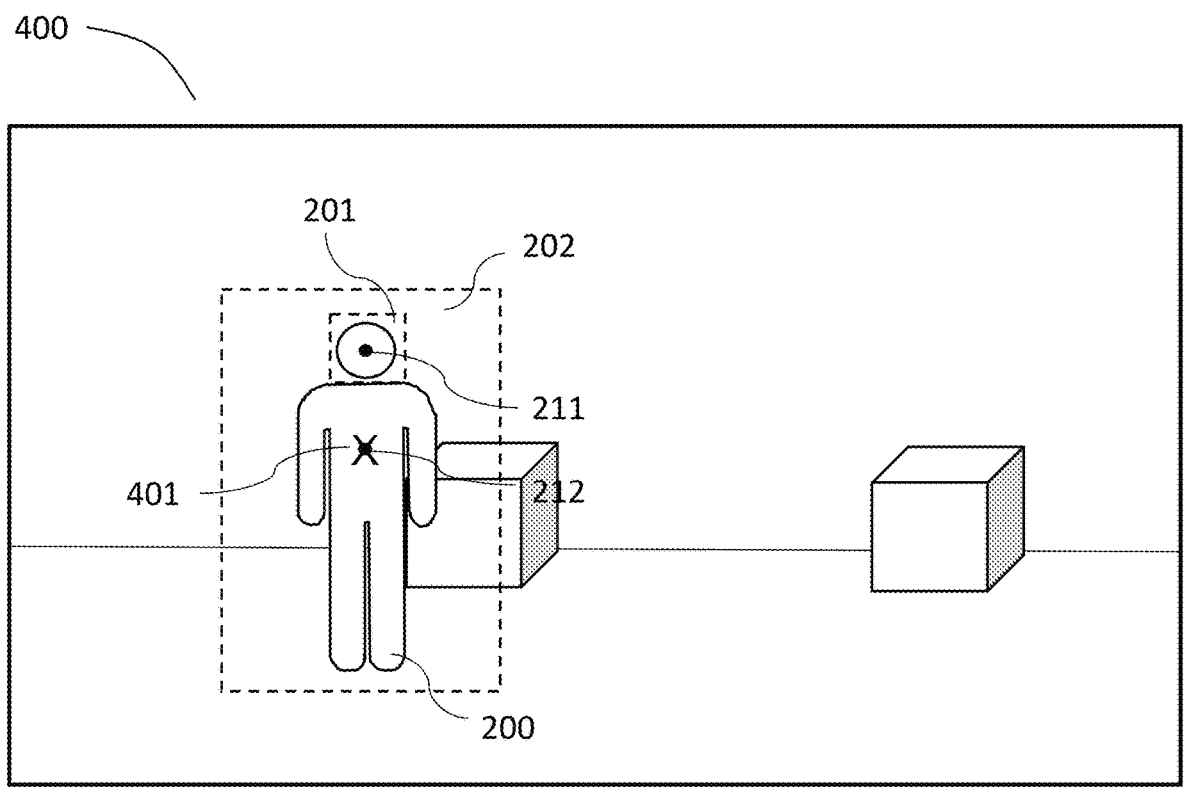
FIGS. 4b to 4d show an exemplary implementation of a method for aim assist in the game environment of FIG. 4a, in accordance with certain embodiments.

Referring to FIG. 4b, the activated aim assist of the video game module simultaneously performs a computer-controlled input to adjust a position of the crosshair 401 onto the second auto-aim position 212 when the aim assist is activated at the time the crosshair 401 is within the second targeting area 202. Alternatively, the computer-controlled input may adjust a position of the crosshair 401 onto the first auto-aim position 211 if the aim assist is activated at the time the crosshair 401 is within the first targeting area 201. The executed attack action is directed in accordance with the adjusted position of the crosshair. For example, the executed attack action hits the target at the second auto-aim position 212. In some embodiments, the aim assist performs the computer-controlled input to adjust the position of the crosshair despite the absence of any manipulation input performed by the user. In other embodiments, the aim assist performs the computer-controlled input to adjust the position of the crosshair regardless of any manipulation input performed by the user. For example, the aim assist ignores or disregards any user-controlled manipulation input while automatically adjusting the position of the crosshair towards the first auto-aim position 211 or second auto-aim position 212 in accordance with the aim assist configuration. The game module deactivates the aim assist following the computer-controlled adjustment of the crosshair onto the second auto-aim position 212 (or the first auto-aim position 211). For example, the aim assist is deactivated immediately after the position of the crosshair is automatically adjusted.

Figure 4C:
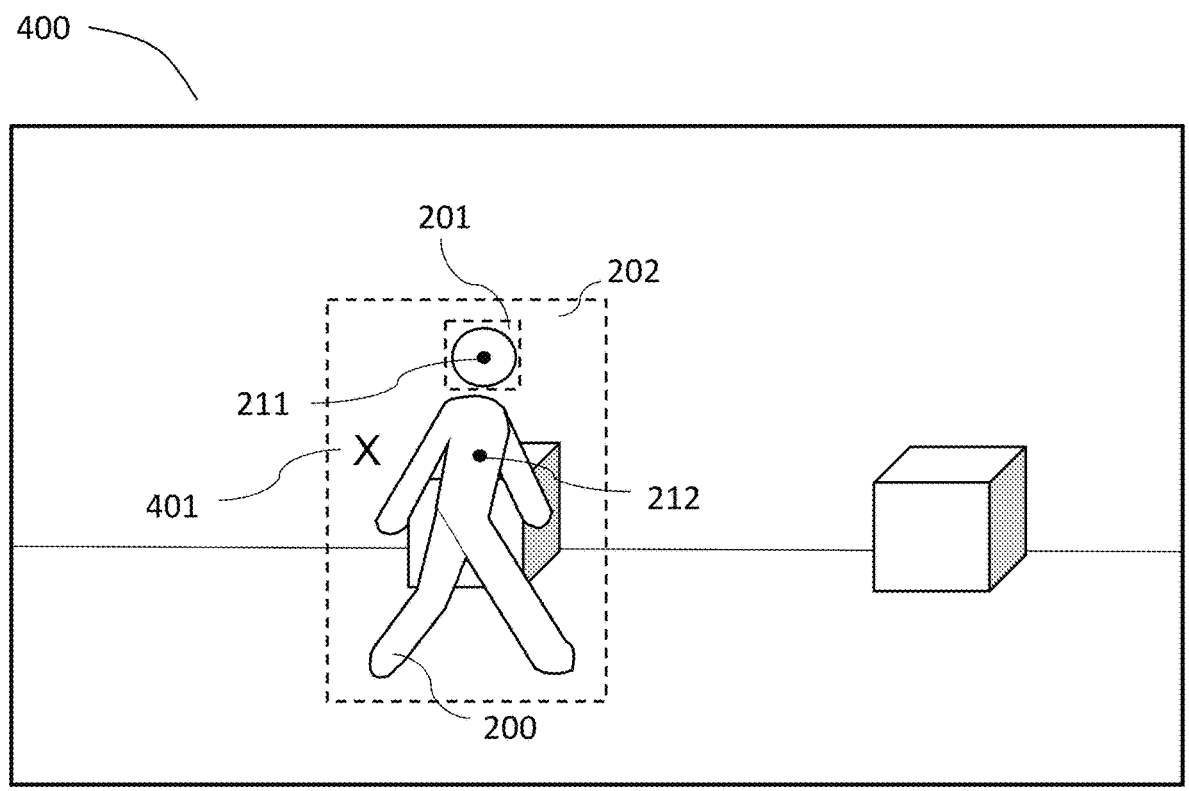

Referring to FIG. 4c, the target 200 may move away from the stationary position to a different position in the game environment during gameplay such that the crosshair is no longer on the target 200. For example, the crosshair may remain stationary in the absence of any manipulation input performed by the user after the game module deactivates the aim assist. In some embodiments, the user operates the firing input element to perform a subsequent firing input, which is sent to the video game module, to initiate and execute a subsequent attack action as the target 200 is moving. The subsequent firing input may be a subsequent intermittent firing input performed by the user. For example, the subsequent attack action is executed as the target 200 is moving to a different position in the game environment. As shown in FIG. 4c, the crosshair 401 may be within the second targeting area 202 and a distance away from the moving target 200 when the subsequent attack action is executed. Upon executing the subsequent attack action, the video game module reactivates the aim assist, as referenced in step 105 of FIG. 1, to direct the subsequent executed attack action.

Figure 4D:
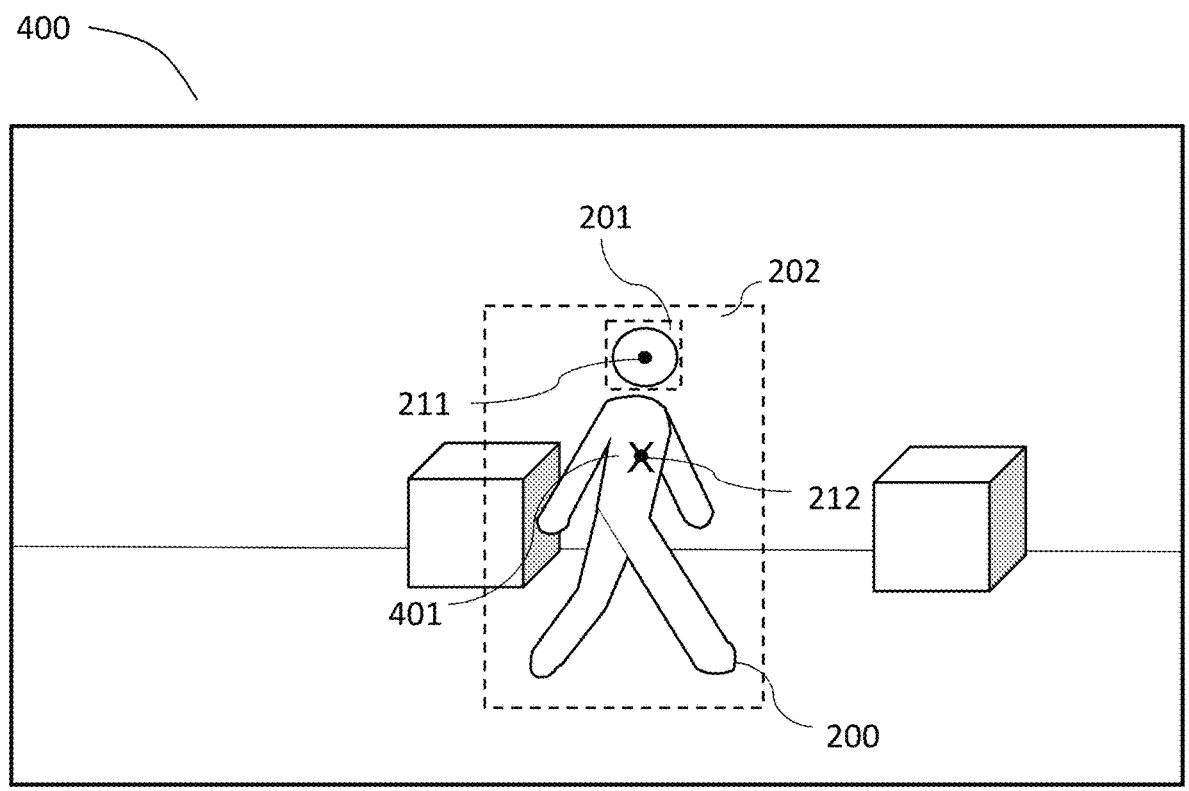

Referring to FIG. 4d, the video game module simultaneously performs a computer-controlled input to adjust the crosshair 401 onto the second auto-aim position 212 of the moving target 200 when the aim assist is activated at the time the crosshair 401 is in the second targeting area 202 of the moving target 200. The executed attack action is directed in accordance with the adjusted position of the crosshair. For example, the executed attack action hits the moving target 200 at the second auto-aim position 212 as the target moves to a different position in the game environment. The game module deactivates the aim assist following the computer-controlled adjustment of the crosshair onto the second auto-aim position 212. The aim assist, as implemented by the video game module, automatically adjusts the crosshair from the targeting area (201, 202) towards the centre of the target 200. This makes it easier for the player to hit the centre of the target as the targeting area (201, 202) is a "bigger target" than the centre of the target 200 (i.e. easier for the player to manoeuvre the crosshair to be within the targeting area as opposed to a particular point or area on the target 200). This is particularly beneficial for users seeking to easily direct user-initiated attack actions towards moving targets 200 using touchscreen controls.

FIGS. 5a-5g show an exemplary game environment displayed from a game viewpoint on a display screen 500 of a device, in accordance with certain embodiments. The device may include a video game system or module. In some embodiments, the display screen 500 is a user interface of a touchscreen-based mobile device as described in FIGS. 4a-4d and the game environment is displayed from a first-person viewpoint. The display screen 500, for example, includes a manipulation input element and a firing input element. In the interest of brevity, elements having the same reference numerals may not be described in detail.

Figure 5A:
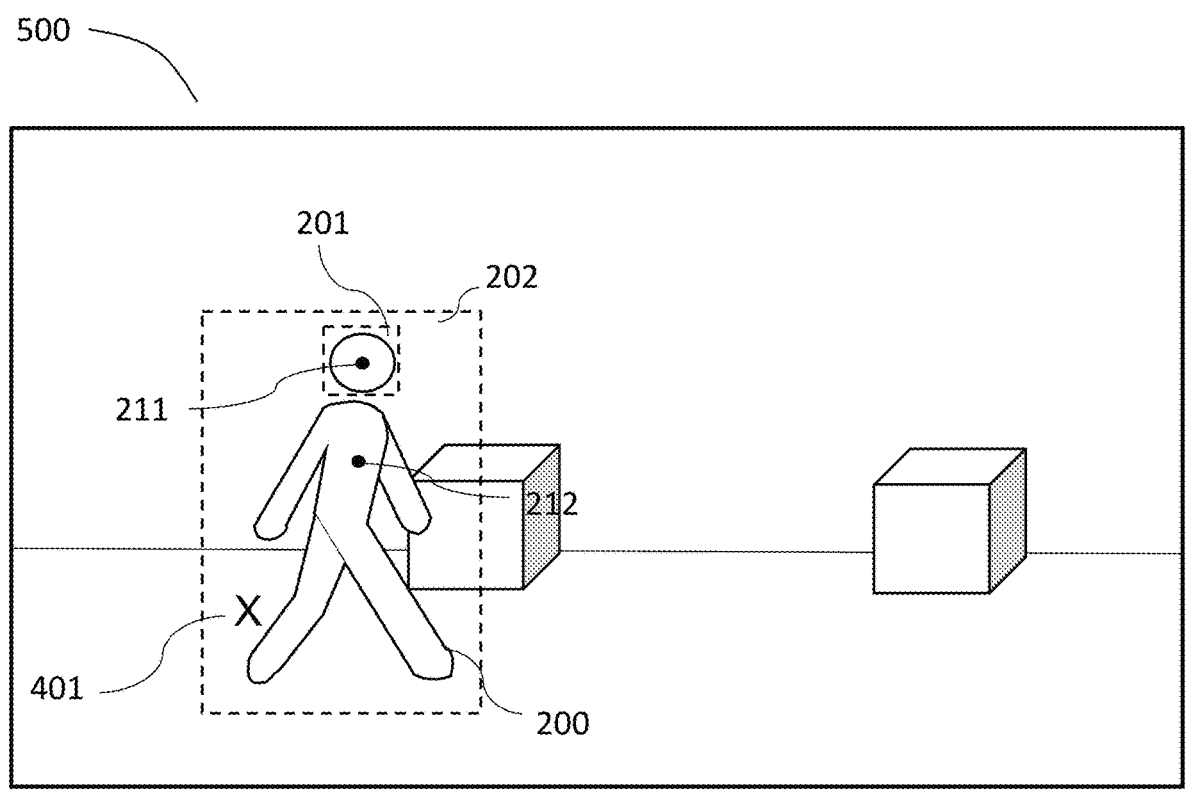
FIG. 5a shows a game environment with a crosshair and a target.

Referring to FIG. 5a, the game environment includes a crosshair 401 and a target 200 as referenced in step 102 of FIG. 1. During game play, the user may operate the manipulation input element to perform one or more manipulation inputs, which are sent to the video game module, to aim the crosshair 401 at the target 200. The target 200 is, for example, a moving target that is moving from a first position towards a second position in the game environment. The user may then operate the firing input element to perform a firing input, which is sent to the video game module, to initiate and execute one or more attack actions. The firing input may be a sustained firing input which the user performs by, for example, pressing and holding the firing input element. In some embodiments, the crosshair 401 may be within the first or second targeting area 201 or 202 without being on the target when an attack action is executed. As shown in FIG. 5a, the crosshair 401 may be anywhere within the second targeting area 202 and a distance away from the moving target 200 when an attack action is executed. In other embodiments, the crosshair 401 may be anywhere within the first targeting area 201 and a distance away from the moving target 200 when an attack action is executed. Upon executing the attack action, the video game module may then activate an aim assist, as referenced in step 105 of FIG. 1, to direct the executed attack action.

Figure 5B:
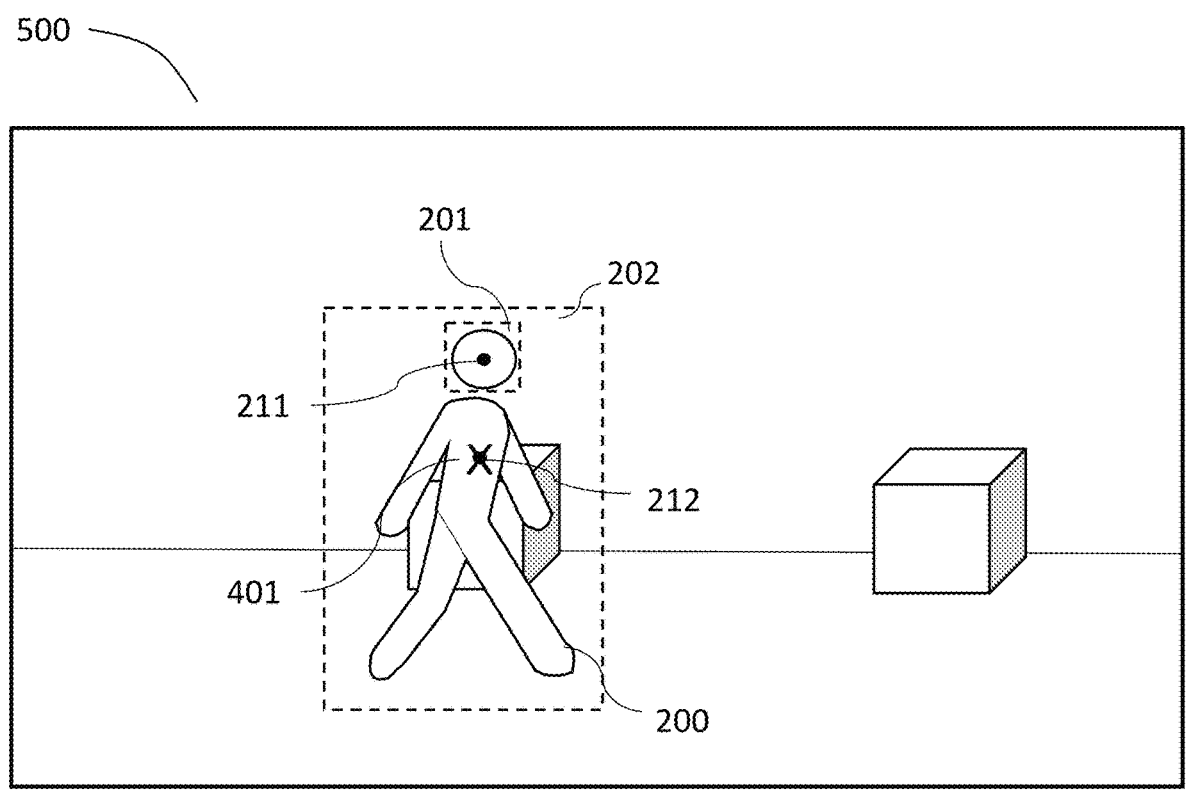
FIGS. 5b to 5g show an exemplary implementation of a method for aim assist in the game environment of FIG. 5a, in accordance with certain alternative embodiments.

Referring to FIG. 5b, the video game module simultaneously performs a computer-controlled input to adjust a position of the crosshair 401 onto the second auto-aim position 212 when the aim assist is activated at the time the crosshair 401 is within the second targeting area 202. Alternatively, the computer-controlled input may adjust a position of the crosshair 401 onto the first auto-aim position 211 if the aim assist is activated at the time the crosshair 401 is within the first targeting area 201. The executed attack action is directed in accordance with the adjusted position of the crosshair. For example, the executed attack action hits the moving target at the second auto-aim position 212. The game module deactivates the aim assist following the computer-controlled adjustment of the crosshair onto the second auto-aim position 212 (or the first auto-aim position 211).

Figure 5C:
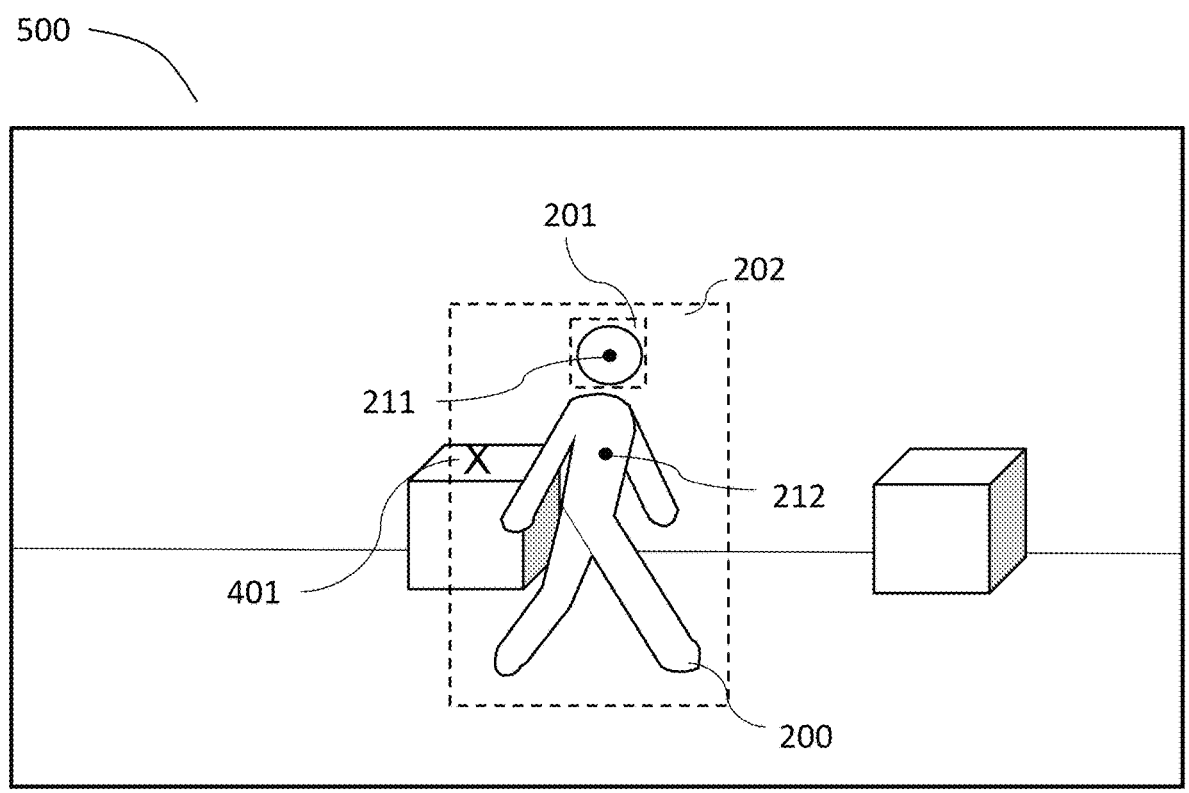

Referring to FIG. 5c, the target 200 may continue moving towards the second position in the game environment during gameplay such that the crosshair is no longer on the target 200. For example, the crosshair may remain stationary in the absence of any manipulation input performed by the user after the game module deactivates the aim assist. In some embodiments, the sustained firing input performed by the user executes a second consecutive attack action as the target 200 is moving. As shown in FIG. 5c, the crosshair 401 may be on the second targeting area 202 and a distance away from the target 200 when the second consecutive attack action is executed. Upon executing the second consecutive attack action, the video game module reactivates the aim assist, as referenced in step 105 of FIG. 1. The reactivated aim assist is, for example, a second aim assist associated with the sustained firing input. For example, the assist strength has decayed (or decreased from a maximum value) by a first resistance value at the time of executing the second attack action in association with a sustained firing input.

Figure 5D:
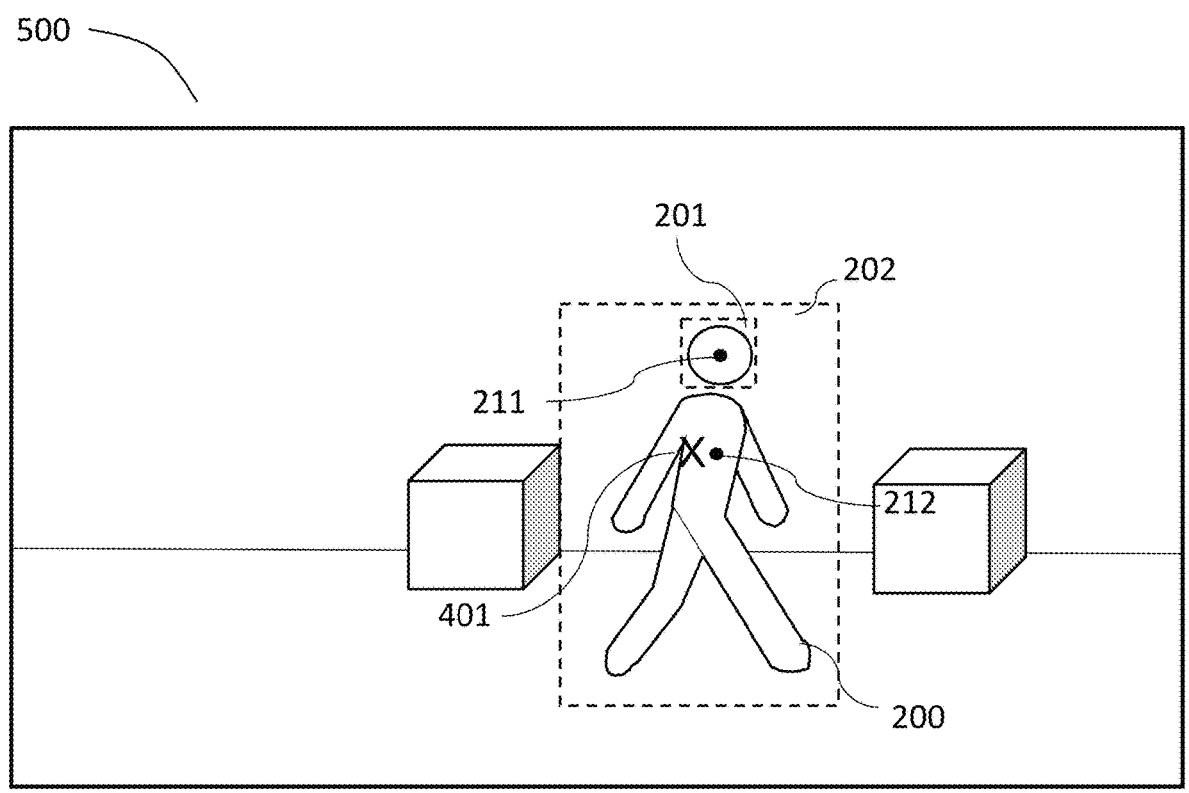

Referring to FIG. 5d, the video game module simultaneously performs a computer-controlled input to adjust the crosshair 401 onto a first offset position when the second aim assist is activated at the time the crosshair 401 is in the second targeting area 202 of the moving target 200. As shown in FIG. 5d, the first offset position of the crosshair may be within the second targeting area and displaced a distance away from the second auto-aim position 212. For example, the first offset position may be a position on (or within) the target 200. The first offset position may be located along the same horizontal axis but along a different vertical axis as the second auto-aim position 212. The executed attack action is directed in accordance with the adjusted position of the crosshair. For example, the executed attack action hits the moving target 200 at the first offset position of the crosshair 401. The game module deactivates the aim assist following the computer-controlled adjustment of the crosshair.

Figure 5E:
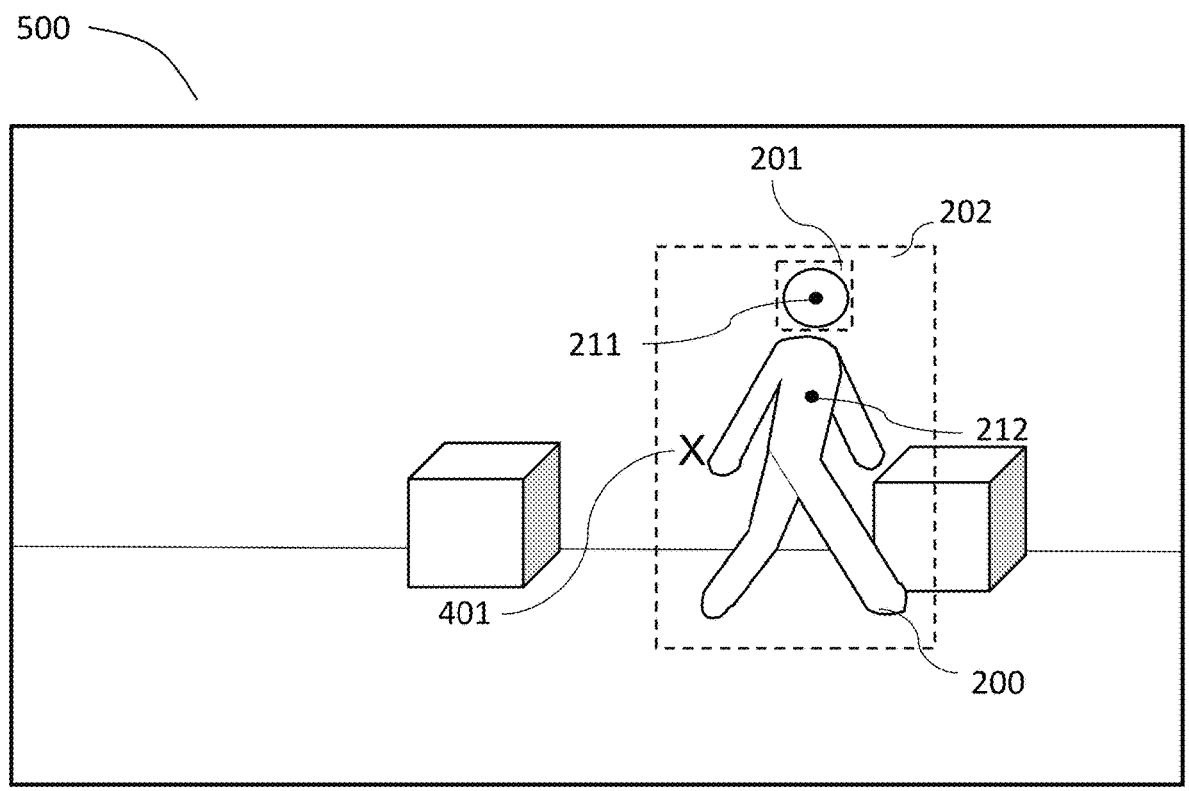

Referring to FIG. 5e, the target 200 may continue moving about the game environment during gameplay such that the crosshair is no longer on the target 200. For example, the crosshair may remain stationary in the absence of any manipulation input performed by the user after the game module deactivates the aim assist. In some embodiments, the sustained firing input performed by the user executes a third consecutive attack action as the target 200 is moving. As shown in FIG. 5e, the crosshair 401 may be within the second targeting area 202 and a distance away from the target 200 when the third consecutive attack action is executed. Upon executing the third consecutive attack action, the video game module reactivates the aim assist, as referenced in step 105 of FIG. 1. The reactivated aim assist is, for example, a third aim assist associated with the sustained firing input. For example, the assist strength has decayed by a second resistance value, which is a value greater than the first resistance value, at the time of executing the third attack action in association with a sustained firing input.

Figure 5F:
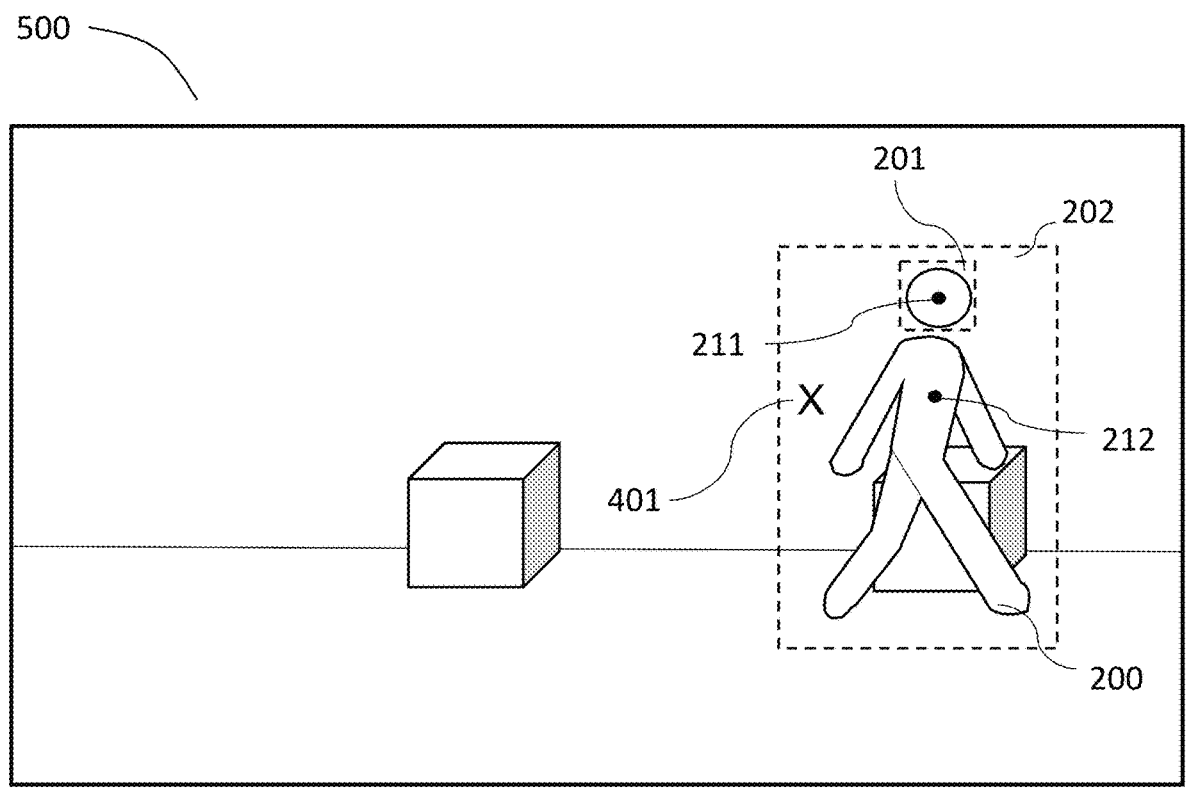

Referring to FIG. 5f, the video game module simultaneously performs a computer-controlled input to adjust the crosshair 401 onto a second offset position when the third aim assist is activated at the time the crosshair 401 is within the second targeting area 202 of the moving target 200. As shown in FIG. 5f, the second offset position of the crosshair may be within the second targeting area 202 and displaced an increased distance away from the second auto-aim position 212. For example, the second offset position is outside of the target 200. The executed attack action is directed in accordance with the adjusted position of the crosshair. For example, the executed attack action does not hit the moving target 200 at the second offset position of the crosshair 401. The game module deactivates the aim assist following the computer-controlled adjustment of the crosshair.

Figure 5G:
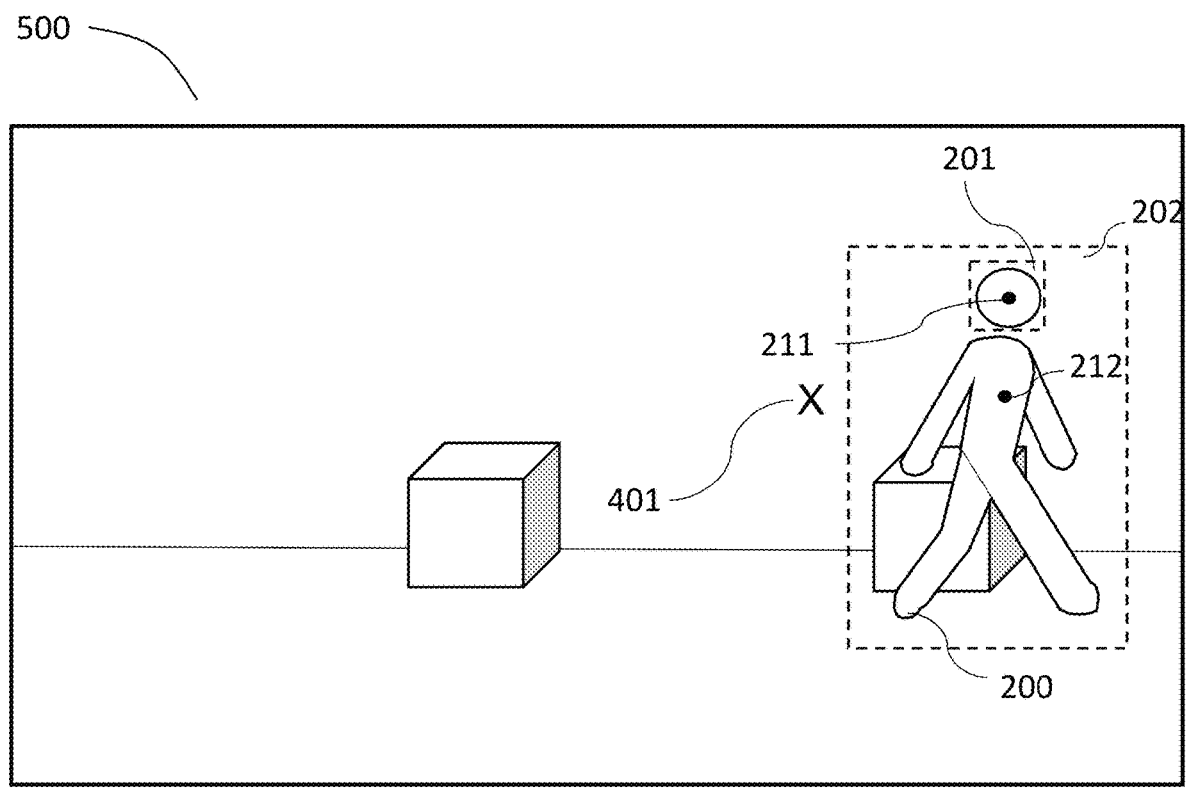

In some embodiments, the sustained firing input performed by the user may continue to execute a fourth consecutive attack action as the target 200 is moving, which activates a fourth aim assist associated with the sustained firing input. For example, the assist strength has decayed by a third resistance value, which is a value greater than the second resistance value, at the time of executing the fourth attack action in association with a sustained firing input. As such, the video game module simultaneously performs a computer-controlled input to adjust the crosshair 401 onto a third offset position. As shown in FIG. 5g, the third offset position of the crosshair may be outside the second targeting area 202 and displaced a greater distance away from the centre of the target 200 than the second offset position.

FIGS. 5f and 5g demonstrate that due to the gradual decay of the assist strength of the aim assist, there comes a point in time where the sustained firing input results in the aim assist no longer being useful. This inverse relationship between the assist strength and the firing input duration advantageously prevents the user from abusing the aim assist through a sustained firing input, thereby providing a balanced aim assist that automatically directs an attack action at a target 200 with increased accuracy while still challenging players to take aim at the target 200, e.g., by positioning the crosshair anywhere within the targeting areas (201, 202), before performing a firing input.

Although the offset positions of the crosshair are shown to be displaced along a horizontal axis away from the second auto-aim position 212, it is appreciated that the offset positions may also be configured to be displaced along a vertical axis or diagonal axis away from the second auto-aim position 212.

The present invention may be implemented in a game that may be operable using a variety of devices or game systems. For example, a device may be a personal computer, a home entertainment system, a portable gaming device, or a mobile computing device. The present methodologies described herein are fully intended to be operable on a variety of devices or game systems. Any hardware platform suitable for performing the methodologies described here is suitable for use with the invention. Computer-readable storage media refer to any medium or media that participate in providing instructions to a CPU for execution. Such media can take many forms, such as but not limited to, non-volatile and volatile media including optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Unless specifically stated otherwise, and as apparent from the following, it will be appreciated that throughout the present specification, discussions utilizing terms such as "receiving", "identifying", 'initiating", "tagging", "transmitting", "running", "incrementing", "determining", "assigning", "approving", "selecting", "sending", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the application, unless specified otherwise, the terms "comprising", "comprise", and grammatical variants thereof, intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A method for aim assist in electronic games, the method comprising:
   generating a game environment in a device;
   generating a crosshair and a target in the game environment, the target having a targeting area, the targeting area comprising a portion of the target and an area of space surrounding the portion of the target;
   receiving a manipulation input from a user for moving the crosshair to different positions in the game environment;
   receiving a firing input from the user;
   executing an attack action in response to receiving the firing input from the user; and
   determining whether the crosshair is within the targeting area at the time of executing the attack action;
   wherein executing the attack action when the crosshair is within the targeting area activates an aim assist to provide a computer-controlled input to adjust a position of the crosshair towards an auto-aim position on the target as the target moves from a first position to a second position in the game environment, and wherein the executed attack action is directed in accordance with the adjusted position of the crosshair.

2. The method of claim 1, wherein the computer-controlled input adjusts the crosshair from the targeting area onto the auto-aim position on the target, the auto-aim position being disposed along a central vertical axis of the target.

3. The method of claim 1, wherein the firing input is a sustained firing input, and in response to receiving the sustained firing input, executing the attack action and subsequent attack actions, and wherein executing the subsequent attack actions when the crosshair is within the targeting area provides the computer-controlled input to adjust the position of the crosshair to an offset position displaced from the auto-aim position.

4. The method of claim 3, wherein for every subsequent attack action, the offset position of the crosshair is displaced a greater distance away from the auto-aim position.

5. The method of claim 3, further comprising determining a firing input duration of the sustained firing input, wherein a distance between the offset position and the auto-aim position increases in relation to an increase in the firing input duration.

6. The method of claim 1, further comprising determining a firing input duration at the time of executing the attack action, wherein an increased firing input duration decreases a distance that the crosshair is moved towards the auto-aim position.

7. The method of claim 6, wherein the increased firing input duration exponentially decreases the distance that the crosshair is moved towards the auto-aim position.

8. The method of claim 1, wherein the auto-aim position is on a centre of a head of the target.

9. The method of claim 1, wherein the auto-aim position is on a centre of a body of the target.

10. The method of claim 1, wherein the device is a mobile computing device.

11. The method of claim 1, wherein the targeting area comprises a first targeting area, the first targeting area comprising a head of the target and an area surrounding the head of the target.

12. The method of claim 11, wherein the targeting area further comprises a second targeting area, the second targeting area is separate and distinct from the first targeting area.

13. The method of claim 12, wherein the second targeting area comprises a portion of a body of the target and an area surrounding the portion of the body of the target.

14. The method of claim 13, wherein the second targeting area is contiguous with the first targeting area.

15. A system comprising one or more computers and one or more storage devices storing computer-readable instructions that, when executed by the one or more computers, cause the one or more computers to perform a method for aim assist in electronic games, the method comprising:
   generating a game environment in a device;
   generating a crosshair and a target in the game environment, the target having a targeting area, the targeting area comprising a portion of the target and an area of space surrounding the portion of the target;
   receiving a manipulation input from a user for moving the crosshair to different positions in the game environment;
   receiving a firing input from the user;
   executing an attack action in response to receiving the firing input from the user; and
   determining whether the crosshair is within the targeting area at the time of executing the attack action;
   wherein executing the attack action when the crosshair is within the targeting area activates an aim assist to provide a computer-controlled input to adjust a position of the crosshair towards an auto-aim position on the target as the target moves from a first position to a second position in the game environment, and wherein the executed attack action is directed in accordance with the adjusted position of the crosshair.

16. One or more non-transitory computer storage media storing instructions that, when executed by one or more computers, cause the one or more computers to perform a method for aim assist in electronic games, the method comprising:
   generating a game environment in a device;
   generating a crosshair and a target in the game environment, the target having a targeting area, the targeting area comprising a portion of the target and an area of space surrounding the portion of the target;
   receiving a manipulation input from a user for moving the crosshair to different positions in the game environment;
   receiving a firing input from the user;
   executing an attack action in response to receiving the firing input from the user; and
   determining whether the crosshair is within the targeting area at the time of executing the attack action;
   wherein executing the attack action when the crosshair is within the targeting area activates an aim assist to provide a computer-controlled input to adjust a position of the crosshair towards an auto-aim position on the target as the target moves from a first position to a second position in the game environment, and wherein the executed attack action is directed in accordance with the adjusted position of the crosshair.

* * * * *